United States Patent
Lin et al.

(10) Patent No.: US 11,028,772 B1
(45) Date of Patent: Jun. 8, 2021

(54) METHOD AND SYSTEM FOR ESTIMATING DAMAGE IN AN INTERNAL COMBUSTION ENGINE

(71) Applicant: Caterpillar Inc., Peoria, IL (US)

(72) Inventors: David J. Lin, Peoria, IL (US); Ashwin A. Hattiangadi, Edwards, IL (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/773,556

(22) Filed: Jan. 27, 2020

(51) Int. Cl.
| | |
|---|---|
| *F02B 77/08* | (2006.01) |
| *F02D 41/22* | (2006.01) |
| *F02D 41/00* | (2006.01) |
| *G08B 5/22* | (2006.01) |
| *F02D 35/02* | (2006.01) |

(52) U.S. Cl.
CPC .......... *F02B 77/082* (2013.01); *F02B 77/083* (2013.01); *F02D 35/025* (2013.01); *F02D 35/026* (2013.01); *F02D 41/0027* (2013.01); *F02D 41/22* (2013.01); *G08B 5/22* (2013.01); *F02B 77/085* (2013.01); *F02D 2041/224* (2013.01); *F02D 2041/228* (2013.01); *F02D 2200/0406* (2013.01); *F02D 2200/08* (2013.01); *F02D 2200/101* (2013.01)

(58) Field of Classification Search
None
See application file for complete search history.

(56) References Cited

U.S. PATENT DOCUMENTS

| | | | |
|---|---|---|---|
| 5,109,692 | A | 5/1992 | Fitzgerald |
| 6,675,639 | B1* | 1/2004 | Schricker ............ G01M 15/102 |
| | | | 73/114.01 |
| 7,104,120 | B2* | 9/2006 | Gladden ................. G07C 3/08 |
| | | | 73/114.77 |
| 7,243,042 | B2 | 7/2007 | Plotts et al. |
| 9,091,616 | B2 | 7/2015 | Moeckly et al. |
| 9,098,951 | B2* | 8/2015 | Nieten ...................... G07C 5/00 |
| 9,103,272 | B2* | 8/2015 | Buckland .............. F02D 41/022 |
| 9,103,273 | B2* | 8/2015 | Buckland ............... F02M 26/01 |
| 9,238,998 | B2* | 1/2016 | Doering ................ F02D 41/022 |
| 9,267,450 | B2* | 2/2016 | Doering ................. F02M 26/06 |
| 9,279,380 | B2* | 3/2016 | Hergart ................... F02D 41/38 |

(Continued)

FOREIGN PATENT DOCUMENTS

WO 2018/209564 A1 11/2018

*Primary Examiner* — Kevin R Steckbauer
(74) *Attorney, Agent, or Firm* — Bookoff McAndrews (57) ABSTRACT

A method for estimating damage of a component of an internal combustion engine includes receiving a fuel rate signal indicative of a fuel rate of the internal combustion engine and estimating a temperature value of the component of the internal combustion engine based on at least the received fuel rate signal. The method also includes estimating an incremental amount of damage of the component of the internal combustion engine based on the estimated temperature value of the component of the internal combustion engine, updating a cumulative amount of damage of the component of the internal combustion engine based on the estimated incremental amount of damage, and outputting a notification based on at least the cumulative amount of damage of the component of the internal combustion engine.

20 Claims, 3 Drawing Sheets

(56) References Cited

U.S. PATENT DOCUMENTS

| | | | | |
|---|---|---|---|---|
| 9,284,898 | B2* | 3/2016 | Buckland | F02B 37/12 |
| 9,317,249 | B2* | 4/2016 | Moeckly | F02C 9/00 |
| 9,341,109 | B2* | 5/2016 | Boyer | F02B 37/183 |
| 9,376,972 | B1* | 6/2016 | Doering | F02M 26/06 |
| 9,441,533 | B2* | 9/2016 | Boyer | F02D 41/0007 |
| 9,556,785 | B2* | 1/2017 | Buckland | F02B 37/183 |
| 9,708,972 | B2* | 7/2017 | Boyer | F02D 41/062 |
| 9,719,412 | B2* | 8/2017 | Buckland | F02D 41/0052 |
| 9,850,811 | B2* | 12/2017 | Doering | F02M 26/06 |
| 9,989,004 | B2* | 6/2018 | Roe | F02B 77/083 |
| 10,060,828 | B2* | 8/2018 | Roe | F02D 35/025 |
| 10,288,003 | B1* | 5/2019 | Shrivastava | F02D 41/1459 |
| 10,364,769 | B2* | 7/2019 | Faied | F02D 41/3809 |
| 10,384,808 | B2* | 8/2019 | Bewlay | F01D 5/288 |
| 10,480,474 | B2* | 11/2019 | Chandrakar | F02M 65/006 |
| 10,648,410 | B2* | 5/2020 | Hanamura | F02D 41/04 |
| 10,738,687 | B2* | 8/2020 | Murakami | F02D 41/221 |
| 2005/0193810 | A1* | 9/2005 | Gladden | G07C 3/08 73/114.01 |
| 2009/0012698 | A1* | 1/2009 | Shinagawa | F02D 13/0215 701/103 |
| 2010/0161196 | A1 | 6/2010 | Goericke et al. | |
| 2012/0283963 | A1 | 11/2012 | Mitchell et al. | |
| 2014/0095015 | A1* | 4/2014 | Nieten | B60G 11/27 701/31.9 |
| 2014/0360179 | A1* | 12/2014 | Doering | F02B 37/18 60/602 |
| 2014/0360180 | A1* | 12/2014 | Doering | F02D 41/04 60/602 |
| 2014/0360181 | A1* | 12/2014 | Buckland | F02M 26/07 60/602 |
| 2014/0360182 | A1* | 12/2014 | Boyer | F02D 13/02 60/602 |
| 2014/0360183 | A1* | 12/2014 | Buckland | F02D 41/0052 60/602 |
| 2014/0360184 | A1* | 12/2014 | Buckland | F02D 41/005 60/602 |
| 2014/0360185 | A1* | 12/2014 | Boyer | F02M 26/04 60/602 |
| 2015/0308359 | A1* | 10/2015 | Buckland | F02B 37/12 60/602 |
| 2015/0322847 | A1* | 11/2015 | Buckland | F02D 13/02 60/273 |
| 2016/0115885 | A1* | 4/2016 | Doering | F02B 37/22 701/108 |
| 2016/0169131 | A1* | 6/2016 | Doering | F02P 5/045 60/605.2 |
| 2016/0258350 | A1* | 9/2016 | Boyer | F02D 41/022 |
| 2017/0284897 | A1* | 10/2017 | Roe | F02B 77/085 |
| 2018/0030913 | A1* | 2/2018 | Roe | F02D 41/22 |
| 2018/0030914 | A1* | 2/2018 | Roe | F02D 35/023 |
| 2018/0291856 | A1* | 10/2018 | Chandrakar | F02D 41/1462 |
| 2019/0128203 | A1* | 5/2019 | Shrivastava | F02D 41/221 |
| 2019/0136782 | A1* | 5/2019 | Faied | F02D 41/221 |
| 2019/0301360 | A1* | 10/2019 | Murakami | G01M 15/042 |
| 2020/0025116 | A1* | 1/2020 | Hanamura | F02D 41/22 |
| 2020/0116024 | A1* | 4/2020 | Reigl | F01D 21/003 |
| 2020/0131987 | A1* | 4/2020 | Lebendt | G01M 15/04 |
| 2020/0318532 | A1* | 10/2020 | Murakami | F02D 19/105 |

* cited by examiner

METHOD AND SYSTEM FOR ESTIMATING DAMAGE IN AN INTERNAL COMBUSTION ENGINE

TECHNICAL FIELD

The present disclosure relates generally to internal combustion engine systems, and more particularly, to methods and systems for estimating damage in one or more components of an internal combustion engine.

BACKGROUND

Internal combustion engines create harsh, high-temperature environments that can change the properties of engine components over time. High-performance engines, including natural gas engines, diesel engines, and dual fuel engines (engines capable of combusting both natural gas and diesel fuel), operate at particularly high temperatures. While increased engine performance provides many benefits, the accompanying elevated temperatures can change the properties of one or more engine components. For example, increased temperature may decrease the fatigue strength of components such as intake valves or exhaust valves. Existing systems for determining when such components require replacement may provide estimates based on engine hours (how long an engine operates), or by detecting symptoms that suggest a failure is imminent. Such systems may fail to take temperature-induced changes into account, and therefore may be inaccurate, particularly for engines that operate at elevated temperatures for extended periods of time.

An exemplary engine component lift monitoring system is disclosed in U.S. Pat. No. 7,243,042 to Plotts et al. (the '042 patent). The monitoring system described in the '042 patent collects parameters useful for determining a temperature of a turbine component. Component damage is calculated for different components of a turbine engine, such as a turbine blade, vane, or combustor component. While the system disclosed in the '042 patent may be useful for turbine engines, it may not be useful for use with a reciprocating internal combustion engine including a piston, an engine head, an intake valve, and/or an exhaust valve.

The disclosed method and system may solve one or more of the problems set forth above and/or other problems in the art. The scope of the current disclosure, however, is defined by the attached claims, and not by the ability to solve any specific problem.

SUMMARY

In one aspect, a method for estimating damage of a component of an internal combustion engine may include receiving a fuel rate signal indicative of a fuel rate of the internal combustion engine and estimating a temperature value of the component of the internal combustion engine based on at least the received fuel rate signal. The method may also include estimating an incremental amount of damage of the component of the internal combustion engine based on the estimated temperature value of the component of the internal combustion engine, updating a cumulative amount of damage of the component of the internal combustion engine based on the estimated incremental amount of damage, and outputting a notification based on at least the cumulative amount of damage of the component of the internal combustion engine.

In another aspect, a method for estimating damage of at least one component for an engine head of an internal combustion engine may include receiving a fuel rate signal indicative of a fuel rate of the internal combustion engine and estimating a temperature value of the at least one component based on at least the received fuel rate signal. The method may also include determining a cumulative amount of damage of the at least one component based on an incremental amount of damage associated with the estimated temperature value and a previously-estimated cumulative amount of damage of the at least one component and displaying a notification associated with the cumulative amount of damage of the at least one component.

In yet another aspect, a damage estimation system may include an internal combustion engine, the internal combustion engine including an engine head and a combustion chamber. The damage estimation system may also include at least one sensor configured to detect a fuel rate of the internal combustion engine and a control unit. The control unit may be configured to control a quantity of fuel delivered to the combustion chamber via at least one intake valve and estimate an incremental amount of damage of at least one component of the engine head based on at least the detected fuel rate. The control unit may also be configured to update a cumulative amount of damage of the at least one component based on the estimated incremental amount of damage and output a notification indicative of the cumulative amount of damage.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
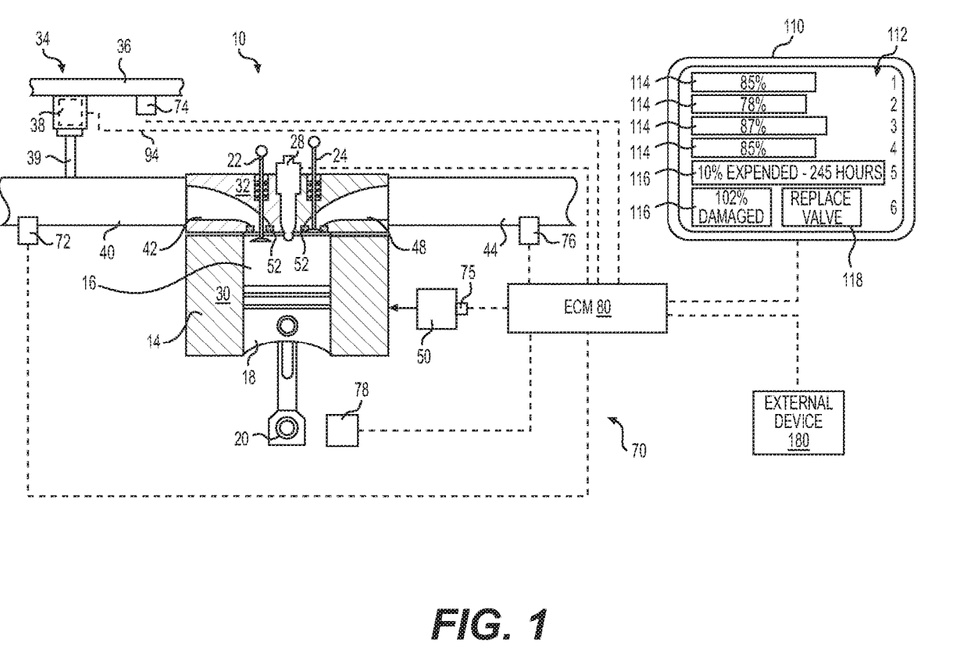
FIG. 1 is a schematic diagram illustrating a damage estimation system according to an aspect of the present disclosure.

FIG. 1 is a schematic diagram illustrating a system 10 for estimating and monitoring change or damage, such as chemical damage, mechanical damage, or other types of damage or change, in at least one component of internal combustion engine system 12. Damage estimation system 10 may include internal combustion engine system 12, sensor system 70, an electronic control module (ECM) 80, a display 110, and an external device 180 which may be located remotely with respect to engine 14 and ECM 80.

Internal combustion engine system 12 may include an internal combustion engine 14 and various associated systems, such as an intake air system and a fuel system, which may together form an intake air and fuel system 34, an exhaust system, etc. Internal combustion engine 14 may be any suitable reciprocating internal combustion engine configured to combust gaseous fuel such as natural gas, propane gas, methane gas, or any other fuel in gaseous form. Internal combustion engine 14 may, additionally or alternatively, be configured to combust liquid fuel such as diesel fuel. In one aspect, internal combustion engine 14 may be a dual-fuel engine configured to operate in a mode in which both diesel fuel and gaseous fuel are combusted. Internal combustion engine 14 may include an engine block 30, a cylinder head or engine head 32, a combustion chamber 16 defined by the block 30 and head 32, and a piston 18 configured to reciprocate within the engine block 30. One or more fuel injectors 28 may optionally be included to provide injection of a liquid fuel such as diesel fuel. Piston 18 may be operably connected to a camshaft 20. Air and fuel system 34 may include a gaseous fuel rail 36, an admission valve 38, an admission passage 39, and an intake manifold 40. Admission valve 38 may be selectively opened by ECM 80 so as to permit a flow of gaseous fuel from fuel rail 36 to intake manifold 40 via admission passage 39. Air and fuel system 34 may be connected via an intake port 42 to combustion chamber 16. An intake valve 22 may be configured to selectively permit communication between intake port 42 and combustion chamber 16 with a valve seat formed on valve insert 52. An exhaust valve 24 may selectively permit communication between exhaust port 48 and combustion chamber 16 with a respective valve seat on insert 52. An exhaust manifold 44 may receive exhaust from combustion chamber 16. A coolant supply device 50 may be configured to supply coolant to one or more cylinders of engine 14.

In one aspect, internal combustion engine 14 may include a plurality of cylinders (e.g., twenty cylinders) that define the same number of combustion chambers 16. Each cylinder may include a respective piston 18 to reciprocate therein. In one aspect, engine 14 may include a plurality of engine heads 32. In particular, engine head 32 may form a section of an engine head assembly, such that a separate engine head 32 is provided for each combustion chamber 16, or for a subset of combustion chambers 16 (e.g., two combustion chambers 16, three combustion chambers 16, etc.). In one aspect, an engine head 32 section may include components such as a plurality (e.g., two) intake valves 22, a plurality (e.g., two) exhaust valves 24, a plurality (e.g., four) valve springs, or any other suitable components. Each engine head 32 section may be individually removable for maintenance or repair, including the replacement of one or more valves 22, 24.

Sensor system 70 may include one or more intake sensors 72, one or more fuel sensors 74, one or more coolant sensors 75, one or more exhaust sensors 76, and one or more engine speed sensors 78. Intake sensors 72 may include one or more of: a temperature sensor such as intake manifold air temperature (IMAT) sensor, a pressure sensor such as an intake manifold absolute pressure (IMAP) sensor, or any other suitable sensors at one or more locations of air and fuel system 34. Fuel sensors 74 may include one or more sensors configured to generate an output, such as a fuel rate signal, indicative of a fuel rate corresponding to a quantity of fuel (fuel flow) provided to combustion chamber 16. For example, fuel sensors 74 may include one or more gaseous fuel pressure sensors. Coolant sensors 75 may include one or more temperature sensors configured to detect a temperature of coolant for managing the temperature of engine 14. Exhaust sensors 76 may include one or more exhaust temperature sensors. Engine speed sensors 78 may be configured to generate a signal indicative of an operating speed of engine 14.

ECM 80 may receive, as inputs, information from each sensor of sensor system 70, including one or more of the intake sensor(s) 72, fuel sensor(s) 74, coolant sensor(s) 75, exhaust sensor(s) 76, or engine speed sensor(s) 78. ECM 80 may receive additional inputs from other sensors or feedback devices to monitor the operation of engine system 12. ECM 80 may be configured to provide, as outputs, control signals to display 110 and/or an external device 180 (e.g., a remote computer, portable computer, cellular device, etc.). For example, ECM 80 may cause display 110 (e.g., a display secured to engine 14 and electrically connected to ECM 80) to present a notification 112 indicative of a remaining life of one or more components of the engine, such as valves 22, 24, and/or valve seats associated with valve inserts 52, valve springs, piston 18, fuel injector 28, etc. While system 10 is described below based on valve components (e.g., valves 22, 24), it is understood that system 10 may be used with any engine component. In one aspect, this notification 112 may include separate notifications for one or more components, or groups of components, of internal combustion engine system 12. These components may include, for example, a particular valve (e.g., a particular intake or exhaust valve 22, 24), or a particular engine head 32 section, such as a section that includes a plurality of valves 22, a plurality of valves 24, and a plurality of inserts 52 having respective valve seats. A group of components may include, for example, the entire group of engine head components. In the exemplary configuration of FIG. 1, display 110 may provide one or more notifications 112 such as remaining life notifications 114 and/or expended life notifications 116. Notifications 112 may also include, when appropriate, one or more prompts 118, such as a warning prompt requesting service or operator action. Each notification 112 may be provided for a different engine component or group of components. Notifications 112 for six exemplary components or groups are shown in the example of FIG. 1, one or more of these notifications 112 may represent a notification for a group of engine head components, such as a group of components secured by an engine head 32 section and/or the engine head 32 section itself. While each component is identified by a number in the exemplary notifications 112, it is understood that each component may be referred to by any appropriate description (e.g., "intake valve 8," "cylinder head 2," or "engine heads"). Remaining life notification 114 may be presented in any suitable form, such as a graphical and/or numerical representation of remaining life of a corresponding component or group of components. Remaining life notification 114 may indicate an amount of remaining life expressed as a percentage, a replacement timing such as an amount of time such as engine-hours, etc. Expended life notification 116 may indicate an amount of life that has been consumed during the operation of engine 14, and may also be expressed as a graphical and/or numerical representation (an exemplary numerical representation being shown in FIG. 1), including a representations in the form of percentages, time, or both. Expended life notification 116 may illustrate an effective amount of time (e.g., engine-hours) that has been expended. The expended amount of time may differ from the actual amount of time the engine 14 has been operating, to reflect an effective "age" of the engine component. One or more prompts 118 may be presented instead of, or in addition to notifications 114 and 116. External device 180 may include a display that provides one or more of the notifications 112 in response to control signals generated by ECM 80.

Figure 2:
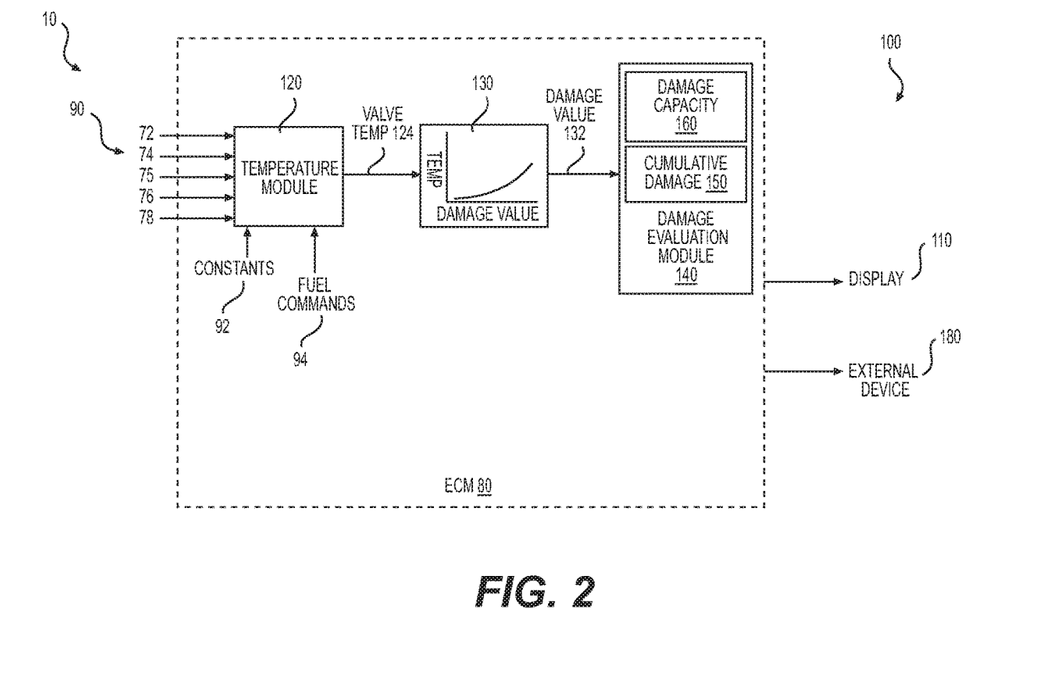
FIG. 2 is a block diagram illustrating an exemplary configuration of a controller of the damage estimation system of FIG. 1.

FIG. 2 is a block diagram illustrating an exemplary configuration of ECM 80. ECM 80 may receive various inputs 90 from sensor system 70. ECM 80 may receive additional inputs, such as inputs from one or more sensors for monitoring other aspects of the operation of engine system 12. ECM 80 may provide, as outputs 100, commands for display 110 and/or external device 180 to cause one or both of display 110 and external device 180 to provide a notification 112 (FIG. 1). ECM 80 may include a temperature module 120 configured to estimate a temperature of at least one engine component as a temperature value or estimated temperature 124, an incremental damage estimator 130 that receives the estimated temperature 124 and outputs an incremental damage value 132, and a damage evaluation module that receives and evaluates the incremental damage value 132, including updating a cumulative damage value 150.

Figure 3:
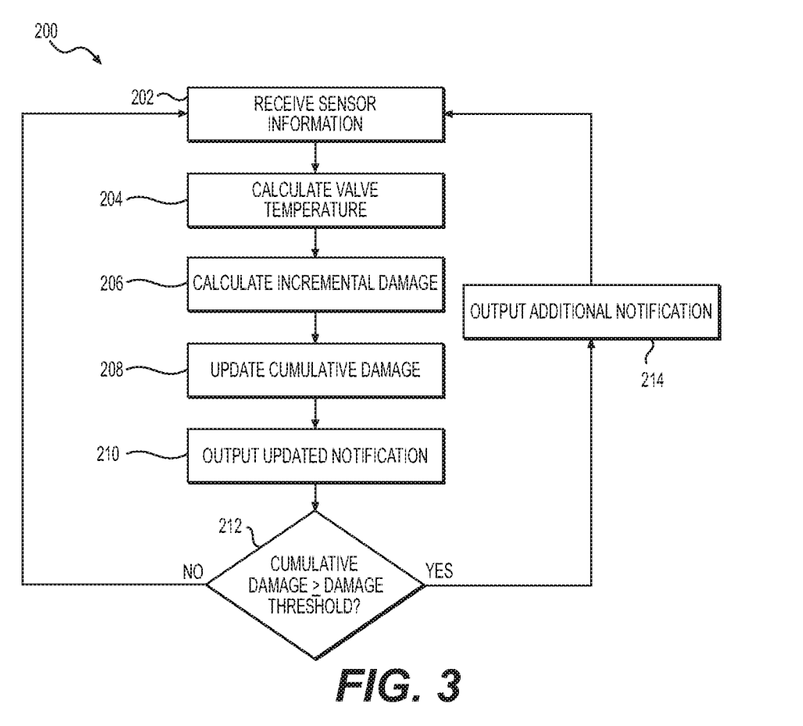
FIG. 3 is a flowchart illustrating an exemplary method according to an aspect of the present disclosure.

ECM 80 may embody a single microprocessor or multiple microprocessors that receive inputs (e.g., inputs 90) and issue control signals or other outputs (e.g., outputs 100). ECM 80 may include a memory, a secondary storage device, a processor, such as a central processing unit or any other means for accomplishing a task consistent with the present disclosure. The memory or secondary storage device associated with ECM 80 may store data and software to allow ECM 80 to perform its functions, including each of the functions described with respect to method 200 (FIG. 3). In particular, such data and software in memory or secondary storage device(s) may allow ECM 80 to perform the functions associated with temperature module 120, incremental damage estimator 130, and damage evaluation module 140, as well as generating outputs 100. The memory or secondary storage may also store one or more constants 92 (e.g., one or more combustion constants) useful for temperature estimation. Further, the memory or secondary storage device associated with ECM 80 may store data received from one or more of the inputs 90 of system 10. Numerous commercially available microprocessors can be configured to perform the functions of ECM 80. Various other known circuits may be associated with ECM 80, including signal-conditioning circuitry, communication circuitry, and other appropriate circuitry.

Inputs 90 may be received by temperature module 120, which may also receive constants 92 and fuel commands 94. In one aspect, constants 92 may include one or more predetermined values such as numerical constants stored in a memory of ECM 80 or a memory associated with ECM 80. Fuel commands 94 may include one or more commands to admission valve 38 for supplying gaseous fuel to combustion chamber 16 via intake port 42, and may form an exemplary fuel rate signal, either alone or in combination with a signal generated and output by one or more fuel sensors 74. These commands may be generated by ECM 80 for controlling internal combustion engine 14, or may be received from a separate control unit for controlling the fuel flow rate of gaseous and/or diesel fuel. When engine 14 is a dual-fuel engine or a diesel engine, fuel commands 94 may include commands for fuel injector 28 in addition to, or instead of, commands for admission valve 38. Temperature module 120 may be configured to estimate or calculate a temperature of at least one engine component. In an exemplary configuration, temperature module 120 may be configured to estimate a temperature of an engine component such as one or more valves 22, 24, and output the estimated valve temperature 124 to an incremental damage estimator 130. Estimated temperature 124 may be any suitable value that reflects (e.g., changes with) the estimated or expected temperature of the engine component. Estimated temperature 124 may include or represent a temperature value such as an estimated temperature in Celsius, Kelvin, or Fahrenheit, or a value having any appropriate units or scale. Temperature module 120 may include, for example, a physics-based model for estimating the temperature value of the at least one engine component. In one aspect, temperature module 120 may include a temperature-predicting model that can estimate the temperature of an engine component based on empirical relationships, experimental data, etc. Thus, temperature module 120 may simulate a temperature sensor for an engine component, such as valves 22, 24, that is not provided with a temperature sensor. In one aspect, temperature module 120 may include a temperature model configured to estimate the temperature of one or more valves 22, 24 based on fuel flow, intake manifold air pressure, intake manifold air temperature, exhaust temperature, and engine speed from sensors 72, 74, 76, and 78. Temperature module 120 may additionally calculate temperature of one or more valves 22, 24 by providing a coolant temperature indicated by coolant sensor 75 to the temperature model. This temperature model may be formed as a physics-based model that, for example, models combustion within combustion chamber 16, and outputs estimated temperature value 124 of valve 22, 24, and/or temperature values of other components (e.g., valve inserts 52, piston 18, fuel injector 28, etc.), determined by modeling.

Incremental damage estimator 130 may form a module that receives temperature information from temperature module 120 and outputs incremental damage information, such as incremental damage value 132, to damage evaluation module 140. In an exemplary configuration, incremental damage estimator 130 may receive one or more estimated valve temperatures 124 from temperature module 120. Damage estimator 130 may calculate or otherwise determine an incremental damage value 132 for each estimated temperature 124 output by temperature module 120, based on a relationship between component temperature and a rate at which damage accumulates. This relationship may be determined by any suitable method, including experimental methods (e.g., experimentally-evaluating changes in strength over time when the engine component is exposed to a various temperatures, such as temperatures over 800 degrees C.). Incremental damage value 132 may represent, for example, an incremental change in a mechanical or chemical condition of the corresponding engine component. In one aspect, incremental damage value 132 may represent an incremental loss in strength (e.g., fatigue strength), in the engine component. In an exemplary configuration, incremental damage value 132 may reflect an incremental amount of damage, such as damage (e.g., loss of fatigue strength) incurred due to oxidation in valve 22 and/or valve 24. In one aspect, incremental damage 132 may represent an incremental amount of damage that occurs independent of an amount of material that has been removed, for example eroded by wear, from a surface of valves 22, 24 or seats associated with valve inserts 52. Additionally or alternatively, incremental damage value 132 may represent wear, or other gradual changes, that may tend to occur at a faster rate in proportion to an increase in temperature of the valve 22 or 24 and/or in valve inserts 52, piston 18, fuel injector 28, etc. Thus, damage value 132 may increase (e.g., in a non-linear manner) due to an increase in estimated temperature 124.

Each incremental damage value 132 output by estimator 130 may be received by damage evaluation module 140. A cumulative damage 150 stored in a memory of ECM 80, which may form an example of a previously-estimated cumulative amount of damage, may be updated each time damage value 132 is calculated, by increasing cumulative damage value 150 by an amount equal to the value represented by damage value 132. In this manner, damage evaluation module 140 may monitor and update the cumulative amount of damage 150 in one or more engine components, including updating cumulative damage value 150 by adding each incremental damage value 132 to a previous cumulative damage value 150. Damage evaluation module 140 may store a different cumulative damage value 150 for one or more components to track an amount of damage (e.g., loss of fatigue strength, oxidation, removed material or surface recession, etc.) that has accumulated in each engine component over time. In one aspect, cumulative damage value 150 may be reset or set to zero each time the corresponding component or group is replaced. This may be performed by a technician or by an operator of internal combustion engine system 12. Following each reset, cumulative damage value 150 may increase based on each incremental damage value 132 received by damage evaluation module 140.

Damage evaluation module 140 may regularly (e.g., at predetermined intervals or continuously) compare the amount of accumulated change represented by cumulative damage value 150 to one or more values of damage capacity 160 which forms an exemplary damage threshold. Damage capacity 160 may represent one or more predetermined threshold values corresponding to an amount of damage that may represent a need to replace the associated component or perform maintenance one the associated component (e.g., clean, inspect, etc.). Thus, a plurality of different damage capacities 160 may be employed for a particular severities of damage for a particular engine component. For example, a first damage capacity 160 may correspond to a damage value that corresponds to 50% of the remaining useful life of the engine component, and may be associated with a need to inspect and/or perform maintenance without replacing the engine component. ECM 80 may be configured to present a first prompt 118, such as a prompt to perform and inspection or maintenance, when first damage capacity 160 is exceeded by cumulative damage value 150. A second damage capacity 160 may be associated with a need to perform replacement of the engine component, and thus may be associated with a threshold such as 10% or 0% of the remaining useful life of the engine component. A second, more urgent, prompt 118, such as a prompt to immediately replace or repair valve 22, 24 (FIG. 1), or engine head 32 and/or an engine head section, may be issued via ECM 80 and display 110 when this second damage capacity 160 is exceeded by cumulative damage value 150. If desired, a plurality of different cumulative damage values 150 may be determined and updated for different types of damage and/or for different engine components or groups of components. In such a case, incremental damage estimators 130 may be included for each type of damage and each engine component or group.

Outputs 100 may allow ECM 80 to regularly update or refresh one or more notifications 112 of display 110, including remaining life notification 114, expended life notification 116, and prompt 118 (FIG. 1). This may be performed, for example, each time cumulative damage 150 is updated, each time cumulative damage 150 increases by a particular amount (e.g., 1%), or at regular intervals during operation of system 10. Thus, each notification 112 may be based on a current value of cumulative damage 150. ECM 80 may also output a command to display and update one or more notifications 112 on external device 180 located remotely with respect to engine 14. For example, one or more notifications 112 may be presented on a display of external device 180 by wireless transmission to external device 180. Thus, external device 180 may display any of the notifications 112 discussed with respect to display 110. Additionally, ECM 80 may output a notification 112 via a communication port (e.g., diagnostic port) associated with ECM 80.

INDUSTRIAL APPLICABILITY

Damage estimation system 10 may be used in conjunction with any appropriate machine or vehicle that includes an internal combustion engine. For example, damage estimation system 10 may be employed on machines such as natural gas power generators, dual-fuel power generators, or other machines or vehicles that include internal combustion engine system 12. During the operation of internal combustion engine system 12, ECM 80 may monitor and control operations of air and fuel system 34, including fuel admission valve 38, and, if present, fuel injector 28. ECM 80 may monitor the status of various engine systems via sensor system 70, and may monitor the state of one or more engine system 12 components, and determine a change in these states, based on sensor system 70, constants 92, and fuel commands 94. ECM 80 of damage estimation system 10 may, based on the determined change such as damage in the state or condition of the engine component, output or update a notification provided via display 110 and/or an external device 180.

FIG. 3 is a flowchart illustrating an exemplary process or method 200 performed by damage estimation system 10 with ECM 80. In a step 202, ECM 80 may receive sensor information from sensor system 70. This sensor information may include, for example, information indicative of at least one of an amount of fuel provided to one or more combustion chambers 16, a temperature of air provided to combustion chambers 16, a pressure of the air provided to combustion chambers 16, coolant temperature, exhaust temperature, and/or engine speed. One or more items of received sensor information may be averaged over a predetermined period of time (e.g., one second), or may be sampled (e.g., measured instantaneously at regular predetermined intervals). In step 204, the received sensor information, constants 92, and fuel commands 94 may be provided to temperature module 120 and input into the temperature model to calculate the component temperature. This temperature may be used, in step 206, to determine an incremental amount (e.g., incremental damage value 132) of change experienced by the engine component. In step 208, ECM 80 may revise or update cumulative damage value 150 for one or more components based on damage value 132. In one aspect, steps 204, 206, and 208 may be performed independently for a plurality of engine components, such as a plurality of engine valves 22, 24. If desired, a different estimated valve temperature 124 may be calculated for each engine component based on modeling via temperature module 120 for that particular component, as well as a different incremental damage value 132. A plurality of respective cumulative damage values 150 may be stored and updated based on the various incremental damage values 132. In one aspect, different types of components may be associated with different temperature models of temperature module 120 and different temperature and damage relationships of incremental damage estimator 130.

Step 210 may include outputting (e.g., displaying) a notification based on the updated or revised cumulative damage value 150. For example, step 210 may include updating a display 110 to display a remaining useful life notification 114, or any other notification 112, based on the current amount of damage represented by cumulative damage value 150. As shown in FIG. 1, different notifications 114, 116 may be provided for different engine components. If desired, these notifications 112 and/or prompts 118, may be provided in different forms (e.g., graphical forms, numerical forms, forms indicating remaining life, forms indicating expended life, etc.). Step 210 may also include outputting one or more notifications 112 via external device 180. Steps 202-208 and, if desired, step 210, may be repeated over regular (e.g., predetermined) intervals while internal combustion engine system 12 is in operation. For example, steps 202-208, and, if desired, step 210, may be performed approximately once every second. If desired, these steps may instead be performed at a faster timing, or a slower. These steps may also include storing each updated cumulative damage value 150 in a memory of ECM 80 or associated with ECM 80. Thus, cumulative damage value 150 may be stored and retained when internal combustion engine 14 is deactivated or shut down. During the next startup of engine 14, ECM 80 may retrieve the previously-stored cumulative value 150.

An optional step 212 may include determining whether the cumulative damage value 150, as updated in step 208, exceeds predetermined damage capacity value 160. When the determination in step 212 is negative (no), the cumulative damage value 150 is smaller than damage capacity value 160, and method 200 may return to step 202. When the determination in step 212 is positive, the cumulative damage value 150 may be equal to or larger than damage capacity value 160. This may occur, for example, when a remaining life of an engine component has dropped below a predetermined level, the component requires maintenance, and/or the component requires replacement. Step 214 may include outputting an additional notification (e.g., prompt 118) that communicates this information to the operator, and/or to a third party via external device 180.

By determining an estimated temperature, via modeling, of an engine component such as an intake or exhaust valve, it may be possible to predict the remaining useful life of the engine component. The use of estimated temperature may be particularly useful for predicting the useful life for engine components that experience oxidation or other damage at high temperatures. A temperature model may employ one or more sensor measurements useful for controlling other aspects of the engine, eliminating the need to add sensors to the engine system. By determining damage by time at temperature, it may be possible to more accurately estimate damage without the need to calculate or estimate other aspects of engine performance, which may improve the accuracy of the damage estimation. Thus, the incurred damage or remaining life may be accurately estimated for high-temperature engines, such as gaseous fuel engines, in which damage to engine head components may occur more rapidly. The remaining useful life may be presented to the operator in a format the communicates when maintenance and/or replacement may be required. Damage to other engine components can be avoided by prompting the operator to replace the damaged part before physical failure occurs.

It will be apparent to those skilled in the art that various modifications and variations can be made to the disclosed method and system without departing from the scope of the disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method for estimating damage of a component of an engine head of an internal combustion engine, the method comprising:
   receiving a fuel rate signal indicative of a fuel rate of the internal combustion engine;
   estimating a temperature value of the component of the engine head of the internal combustion engine based on at least the received fuel rate signal;
   estimating an incremental amount of damage of the component of the engine head of the internal combustion engine based on the estimated temperature value of the component of the engine head of the internal combustion engine;
   updating a cumulative amount of damage of the component of the engine head of the internal combustion engine based on the estimated incremental amount of damage; and
   outputting a notification based on at least the cumulative amount of damage of the component of the engine head of the internal combustion engine.

2. The method of claim 1, wherein the component includes an intake valve of the engine head of the internal combustion engine.

3. The method of claim 1, wherein outputting the notification includes displaying the notification on a display associated with the internal combustion engine.

4. The method of claim 1, further including receiving sensor information including an intake air pressure, an exhaust temperature, and an engine speed.

5. The method of claim 1, wherein the estimated incremental amount of damage is independent of an amount of material removed from the component of the engine head of the internal combustion engine.

6. The method of claim 1, wherein the notification is indicative of an expected replacement timing of the component of the engine head of the internal combustion engine.

7. The method of claim 1, further including comparing the cumulative amount of damage to a damage threshold, wherein the notification is output when the cumulative amount of damage is greater than the damage threshold and is indicative of an immediate need to replace the component of the engine head of the internal combustion engine.

8. The method of claim 1, wherein the notification is indicative of an estimated remaining life of the component of the engine head of the internal combustion engine, or indicative of an estimated expended life of the component of the engine head of the internal combustion engine.

9. A method for estimating damage of at least one component of an engine head of an internal combustion engine, the method comprising:
   receiving a fuel rate signal indicative of a fuel rate of the internal combustion engine;
   estimating a temperature value of the at least one component of the engine head based on at least the received fuel rate signal;
   determining a cumulative amount of damage of the at least one component of the engine head based on an incremental amount of damage associated with the estimated temperature value and a previously-estimated cumulative amount of damage of the at least one component of the engine head; and displaying a notification associated with the cumulative amount of damage of the at least one component of the engine head.

10. The method of claim 9, wherein the notification is indicative of an expected replacement timing for a group of engine head components including one or more valves of the engine head.

11. The method of claim 9, wherein the fuel rate is a natural gas fuel rate and the estimated temperature value is estimated based on at least the fuel rate and an exhaust temperature.

12. The method of claim 9, wherein the notification is indicative of an expected replacement timing of the at least one component and is displayed on a display associated with the internal combustion engine.

13. The method of claim 9, wherein the notification is indicative of an expected replacement timing of the at least one component of the engine head and is displayed on a device located remotely with respect to the internal combustion engine.

14. The method of claim 9, wherein the notification is indicative of an expected replacement timing of the at least one component of the engine head, the at least one component of the engine head includes an intake valve or an exhaust valve of the engine head, and the expected replacement timing is determined independent of an amount of material removed from the intake valve or the exhaust valve.

15. A damage estimation system, comprising:
   an internal combustion engine including:
     an engine head; and
     a combustion chamber;
   at least one sensor configured to detect a fuel rate of the internal combustion engine; and
   a control unit configured to:
     control a quantity of fuel delivered to the combustion chamber via at least one intake valve;
     estimate a temperature of at least one component of the engine head based on at least the detected fuel rate;
     estimate an incremental amount of damage of the at least one component of the engine head based on at least the estimated temperature;
     update a cumulative amount of damage of the at least one component based on the estimated incremental amount of damage; and
     output a notification indicative of the cumulative amount of damage.

16. The damage estimation system of claim 15, wherein the control unit includes a temperature model configured to determine a temperature value of the at least one component of the engine head based on at least the detected fuel rate.

17. The damage estimation system of claim 15, further including at least one sensor configured to detect an exhaust temperature, wherein the estimated temperature is based on at least the detected exhaust temperature and the detected fuel rate.

18. The damage estimation system of claim 15, wherein the control unit is configured to control a quantity of a gaseous fuel delivered to the combustion chamber by outputting a control signal to an admission valve in fluid communication with an intake port.

19. The damage estimation system of claim 15, wherein the notification is indicative of an amount of strength lost by the at least one component of the engine head.

20. The damage estimation system of claim 15, wherein the control unit is configured to output a plurality of notifications for a plurality of components, including the at least one component of the engine head.

* * * * *